(12) United States Patent
Kumai

(10) Patent No.: US 8,687,151 B2
(45) Date of Patent: Apr. 1, 2014

(54) POLARIZATION ELEMENT COMPRISING A PLURALITY OF METAL PROTRUDING SECTIONS FORMED IN A STRIPED MANNER HAVING FIRST AND SECOND HEAT RADIATION SECTIONS TILTED IN OPPOSITE DIRECTIONS

(75) Inventor: Yoshitomo Kumai, Okaya (JP)

(73) Assignee: Seiko Epson Corporation (JP)

( * ) Notice: Subject to any disclaimer, the term of this patent is extended or adjusted under 35 U.S.C. 154(b) by 170 days.

(21) Appl. No.: 12/881,561

(22) Filed: Sep. 14, 2010

(65) Prior Publication Data

US 2011/0102712 A1 May 5, 2011

(30) Foreign Application Priority Data

Oct. 30, 2009 (JP) ................................. 2009-250078
May 6, 2010 (JP) ................................. 2010-106683

(51) Int. Cl.
*G02F 1/1335* (2006.01)
*G02F 1/1333* (2006.01)

(52) U.S. Cl.
USPC .............................. 349/96; 349/161; 349/162

(58) Field of Classification Search
USPC ................... 349/96–103, 161, 162
See application file for complete search history.

(56) References Cited

U.S. PATENT DOCUMENTS

| | | |
|---|---|---|
| 2004/0264350 A1 | 12/2004 | Ueki et al. |
| 2007/0242187 A1* | 10/2007 | Yamaki et al. .................. 349/96 |
| 2008/0094547 A1 | 4/2008 | Sugita et al. |
| 2008/0137010 A1 | 6/2008 | Kumai |
| 2009/0066885 A1* | 3/2009 | Kumai ............................ 349/96 |
| 2009/0153961 A1* | 6/2009 | Murakami et al. ............ 359/486 |
| 2011/0261455 A1 | 10/2011 | Sugita et al. |

FOREIGN PATENT DOCUMENTS

| | | |
|---|---|---|
| JP | 11-258569 | 9/1999 |
| JP | 2005-037900 A | 2/2005 |
| JP | 2006-003447 A | 1/2006 |
| JP | 2007-017762 | 1/2007 |
| JP | 2007-052315 | 3/2007 |
| JP | 2008-102416 A | 5/2008 |
| JP | 2008-145573 | 6/2008 |
| JP | 2008-216956 A | 9/2008 |
| JP | 2008-299178 | 12/2008 |
| JP | 2009-069382 | 4/2009 |
| JP | 2010-049280 | 3/2010 |

* cited by examiner

*Primary Examiner* — Paul Lee
(74) *Attorney, Agent, or Firm* — Harness, Dickey & Pierce, P.L.C.

(57) ABSTRACT

A polarization element includes: a substrate; a plurality of protruding sections formed on the substrate in a striped manner in a plan view; and a heat radiation section formed on a top portion of each of the protruding sections, wherein the heat radiation section has a concavo-convex section.

9 Claims, 5 Drawing Sheets

POLARIZATION ELEMENT COMPRISING A PLURALITY OF METAL PROTRUDING SECTIONS FORMED IN A STRIPED MANNER HAVING FIRST AND SECOND HEAT RADIATION SECTIONS TILTED IN OPPOSITE DIRECTIONS

BACKGROUND

1. Technical Field

The present invention relates to a polarization element, a liquid crystal device, an electronic device, and a method of manufacturing a polarization element.

2. Related Art

A projector as an example of an electronic device is equipped with, for example, a liquid crystal device as a light modulation device. As the liquid crystal device, there has been known one having a configuration in which a liquid crystal layer is sandwiched between a pair of substrates disposed so as to be opposed to each other. The pair of substrates are each provided with an electrode for applying a voltage to the liquid crystal layer. Further, each of the substrates is provided with a polarization element so that a predetermined polarized light beam is input to and output from the liquid crystal layer.

Incidentally, in the projector described above a halogen lamp, a high-pressure mercury lamp, or the like is used as a light source. Further, since a strong light beam is applied to the polarization element from the light source, the polarization element might be deteriorated due to the heat caused by the light beam thus applied to thereby degrade the optical characteristic thereof. Therefore, there has been known one having a configuration of feeding air between the liquid crystal device and the polarization element using a cooling fan to thereby cool the polarization element (see, e.g., JP-A-11-258569).

However, in the configuration described above, there is a problem that a air feeding device (e.g., a cooling fan, a duct for leading the air from the fan to the polarization element) for feeding air to the polarization element is required, and therefore, the number of components increases, and the configuration becomes complicated.

SUMMARY

An advantage of some aspects of the invention is to provide a solution to at least a part of the problem described above, and the invention can be embodied as the following aspects or application examples.

Application Example 1

According to this application example of the invention, there is provided a polarization element including a substrate, a plurality of protruding sections formed on the substrate in a striped manner in a plan view, and a heat radiation section formed on a top portion of each of the protruding sections, wherein the heat radiation section has a concavo-convex section.

According to the configuration of this application example of the invention, heat radiation can efficiently be performed with a simple and easy configuration using the protruding sections formed on the substrate, the heat radiation section having the concavo-convex sections formed on the protruding sections. Further, in the case in which the polarization element is used as a part of the light modulation device of a projector, for example, when the light is emitted from the halogen lamp or the high-pressure mercury lamp or the like as the light source, the heat caused by the emitted light is released from the protruding sections and the heat radiation sections, and thus it becomes possible to prevent deterioration and degradation of the optical characteristic due to the heat. Further, since the heat radiation sections have the concavo-convex sections, the surface area is increased, and thus the heat radiation property can be enhanced.

Application Example 2

According to this application example of the invention, each of the heat radiation sections of the polarization element according to the above application example of the invention has a bend section bending toward the same direction.

According to the configuration of this application example of the invention, the surface area of the heat radiation sections can be increased, and at the same time, the heat radiation section can be disposed at a high density or arranged at a high density.

Application Example 3

According to this application example of the invention, the heat radiation section of the polarization element according to the above application example of the invention includes a first heat radiation section formed on a surface of the top portion of each of the protruding sections so as to be tilted toward one of adjacent ones of the protruding sections with respect to the surface of the top portion, and a second heat radiation section formed on the first heat radiation section so as to be tilted toward the other of adjacent ones of the protruding sections with respect to the surface of the top portion.

According to the configuration of this application example of the invention, since the first heat radiation sections and the second heat radiation sections are formed in the tilted directions different from each other, the bend sections are formed at the junction sections between the first heat radiation sections and the second heat radiation sections. Thus, the surface area of the heat radiation sections is increased, and thus, the heat radiation property can be improved.

Application Example 4

According to this application example of the invention, in the polarization element of the above application example of the invention, a gap is provided between adjacent ones of the heat radiation sections.

According to the configuration of this application example of the invention, the heat is radiated from the gap formed between the adjacent heat radiation sections in addition to the heat radiation from the protruding sections and the heat radiation sections, and therefore, the heat radiation property can further be improved.

Application Example 5

According to this application example of the invention, in the polarization element of the above application example of the invention, the heat radiation sections adjacent to each other partially overlap each other, the heat radiation sections are formed so as to cover the surface of the substrate in a plan view.

According to the configuration of this application example of the invention, since the heat radiation sections have the heat radiation function, and at the same time cover the protruding sections and the substrate in a plan view, the heat radiation sections also function as a protective film for protecting the protruding sections. In other words, it becomes possible to make handling of the polarization element easy, and at the same time, to prevent dust, moisture (water droplets), and so on from entering the substrate and the protruding sections to thereby enhance the reliability.

Application Example 6

According to this application example of the invention, in the polarization element of the above application example of the invention, the heat radiation section further includes a third heat radiation section formed between adjacent ones of the second heat radiation sections.

According to the configuration of this application example of the invention, since the surface area of the heat radiation section is further increased, the heat radiation property can be improved. Further, since the area between the adjacent heat radiation sections is covered by the third heat radiation sections, the heat radiation section functions as the protective film for protecting the protruding sections. In other words, it becomes possible to prevent dust and moisture from entering the substrate or the protruding sections, and thus the reliability can further be improved.

Application Example 7

According to this application example of the invention, in the polarization element of the above application example of the invention, there are provided spaces each surrounded by the substrate, adjacent ones of the protruding sections, and the heat radiation sections formed on the respective protruding sections.

According to the configuration of this application example of the invention, for example, when the light is emitted from the side of the heat radiation sections toward the side of the substrate, the light transmitted through the heat radiation sections proceeds toward the substrate via the spaces. Here, since the refractive index in the space is nearly one, the light entering the space proceeds toward the substrate without being refracted, and therefore, the optical characteristic can sufficiently be assured.

Application Example 8

According to this application example of the invention, the protruding section of the polarization element according to the above application example of the invention includes a first protruding section formed on the substrate, and a second protruding section formed on the first protruding section, the first protruding section is made of a light reflecting material having a relatively high light reflecting property, and the second protruding section is made of a light absorbing material having a relatively high light absorbing property.

According to the configuration of this application example of the invention, it is possible to assure the desired light absorbing property in the second protruding sections while assuring the desired light reflecting property in the first protruding sections. Thus, it is possible to improve the display contrast in the case of applying the polarization element to the display device, for example.

Application Example 9

According to this application example of the invention, there is provided a method of manufacturing a polarization element including the steps of (a) forming a plurality of protruding sections on a substrate in a striped manner in a plan view; and (b) forming a heat radiation section on a top portion of each of the protruding sections, the heat radiation section having a concavo-convex section.

According to the configuration of this application example of the invention, the protruding sections are formed on the substrate and the heat radiation sections having the concavo-convex formation are formed on the respective protruding sections. Thus, heat radiation can effectively be performed with simple and easy configuration. Further, in the case in which the polarization element is used as a part of the light modulation device in a projector, for example, when the light is emitted from the halogen lamp or the high-pressure mercury lamp or the like as the light source, the heat caused by the emitted light is released from the protruding sections and the heat radiation sections, and thus it becomes possible to prevent deterioration and degradation of the optical characteristic due to the heat. Further, since the heat radiation sections have the concavo-convex shapes, the surface area is increased, and thus the heat radiation property can be enhanced.

Application Example 10

According to this application example of the invention, the step (b) of the method of manufacturing a polarization element according to the above application example of the invention includes the steps of (b-1) performing oblique deposition from a side of one of adjacent ones of the protruding sections to thereby form tilted first heat radiation sections on top portions of the protruding sections, and (b-2) performing oblique deposition from a side of the other of the adjacent ones of the protruding sections to thereby form tilted second heat radiation sections on the first heat radiation sections.

According to the configuration of this application example of the invention, the first heat radiation sections and the second heat radiation sections formed by the oblique deposition with the tilt angles different from each other and thus tilted in the directions different from each other. Therefore, the bend sections are formed at the junction sections between the first heat radiation sections and the second heat radiation sections. Thus, the surface area of the heat radiation sections is increased, and thus, the heat radiation property can be improved. Further, in the oblique deposition, it is assumed that the deposition amount is different between the area with a short distance from the deposition source and the area with a long distance therefrom. Therefore, since the sum of the volumes of the first heat radiation section and the second heat radiation section becomes approximately constant (even) by performing the oblique deposition from one direction and the other direction, it is possible to stabilize the polarization state to thereby improve the optical characteristics.

Application Example 11

According to this application example of the invention, the step (b) of the method of manufacturing a polarization element according to the above aspect of the invention includes the step of (b-3) forming a gap between adjacent ones of the heat radiation sections.

According to the configuration of this application example of the invention, the heat is radiated from the gap formed between the adjacent heat radiation sections in addition to the heat radiation from the protruding sections and the heat radiation sections, and therefore, the heat radiation property can further be improved.

Application Example 12

According to this application example of the invention, the step (b) of the method of manufacturing a polarization element according to the above application example of the invention includes the step of (b-4) forming, after step (b-2), third heat radiation sections between adjacent ones of the second heat radiation sections.

According to the configuration of this application example of the invention, since the surface area of the heat radiation section is further increased, the heat radiation property can be improved. Further, since the area between the adjacent heat radiation sections is covered by the third heat radiation sections, the heat radiation section functions as the protective film for protecting the protruding sections. It becomes possible to prevent dust and moisture from entering the substrate or the protruding sections, and thus the reliability can further be improved.

Application Example 13

According to this application example of the invention, the step (b) of the method of manufacturing a polarization element according to the above application example of the invention includes the step of (b-5) performing oblique deposition on the protruding sections to form the heat radiation sections on the top portions of the protruding sections, and to form spaces each surrounded by the substrate, adjacent ones of the protruding sections, and the heat radiation sections formed on the adjacent ones of the protruding sections.

According to the configuration of this application example of the invention, for example, when the light is emitted from the side of the heat radiation sections toward the side of the substrate, the light transmitted through the heat radiation sections proceeds toward the substrate via the spaces. Here, since the refractive index in the space is nearly one, the light entering the space proceeds toward the substrate without being refracted, and therefore, the optical characteristic can sufficiently be assured.

Application Example 14

According to this application example of the invention, there is provided a liquid crystal device including one of the polarization element of the above application example of the invention and the polarization element manufactured by the method of the above application example of the invention.

According to the configuration of this application example of the invention, the liquid crystal device superior in the heat radiation property can be provided.

Application Example 15

According to this application example of the invention, there is provided an electronic device including one of the polarization element of the above application example of the invention, the polarization element manufactured by the method of the above application example of the invention, and the liquid crystal device of the above application example of the invention.

According to the configuration of this application example of the invention, a high-grade electronic device can be provided. In this case, a projection display device such as a projector, a portable terminal such as a cellular phone, or a television set, for example, corresponds to the electronic device.

Application Example 16

According to this application example of the invention, there is provided a polarization element including a substrate, a plurality of metal protruding sections extending along a first direction, arranged in a second direction perpendicular to the first direction at a distance from each other on the substrate, and protruding toward the opposite side to the substrate, and a plurality of heat radiation sections respectively formed on at least a half of the plurality of metal protruding sections so as to protrude toward an opposite side to the substrate, the heat radiation sections each made of a material different from a constituent material of the metal protruding sections, wherein each of the heat radiation sections bends or curves at at least one place in a cross-sectional view perpendicular to the first direction.

According to the configuration of this application example of the invention, since each of the heat radiation sections bends or curves at least one place, the surface area of each of the heat radiation section can be increased. Therefore, it becomes possible to make the heat radiation property of each of the heat radiation sections excellent to thereby prevent the temperature of the polarization element from rising excessively. As a result, the degradation of the optical characteristics of the polarization element can be prevented.

Application Example 17

According to this application example of the invention, in the polarization element of the above application example of the invention, it is preferable that each of the heat radiation sections has a first portion tilted with respect to a normal direction of the substrate in a cross-sectional view perpendicular to the first direction, and a second portion disposed at a position on an opposite side of the first portion to the substrate so as to be tilted with respect to the normal direction of the substrate toward the opposite side to the first portion.

According to the configuration of this application example of the invention, the heat radiation sections are each arranged to be bent or curved in the cross-sectional view perpendicular to the first direction. Thus, it becomes possible to increase the surface area of each of the heat radiation sections.

Application Example 18

According to this application example of the invention, in the polarization element of the above application example of the invention, it is preferable that each of the heat radiation sections has a third portion disposed at a position opposite to the substrate with respect to the second portion, so as to be tilted toward an opposite side to the second portion with respect to the normal direction of the substrate in a cross-sectional view perpendicular to the first direction.

According to the configuration of this application example of the invention, the heat radiation sections are each arranged to be bent or curved at least two places in the cross-sectional view perpendicular to the first direction. Thus, it becomes possible to further increase the surface area of each of the heat radiation sections.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
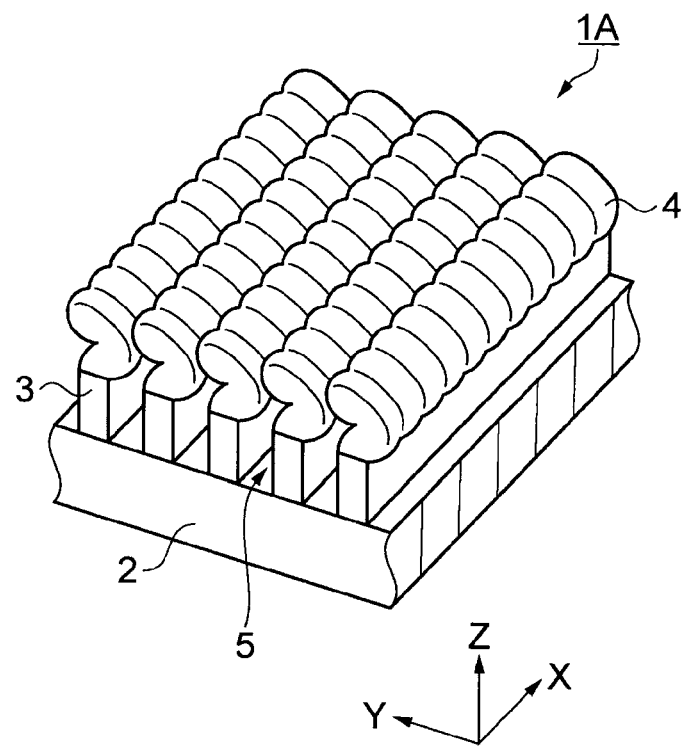
FIGS. 1A and 1B are schematic diagrams showing a configuration of a polarization element according to a first embodiment of the invention.

Hereinafter, first through three embodiments of the invention will be described with reference to the accompanying drawings. It should be noted that each of members in each of the drawings is illustrated with a different scale from each other in order for providing a size large enough to be recognized in the drawing.

First Embodiment

Configuration of Polarization Element

Figure 1B:
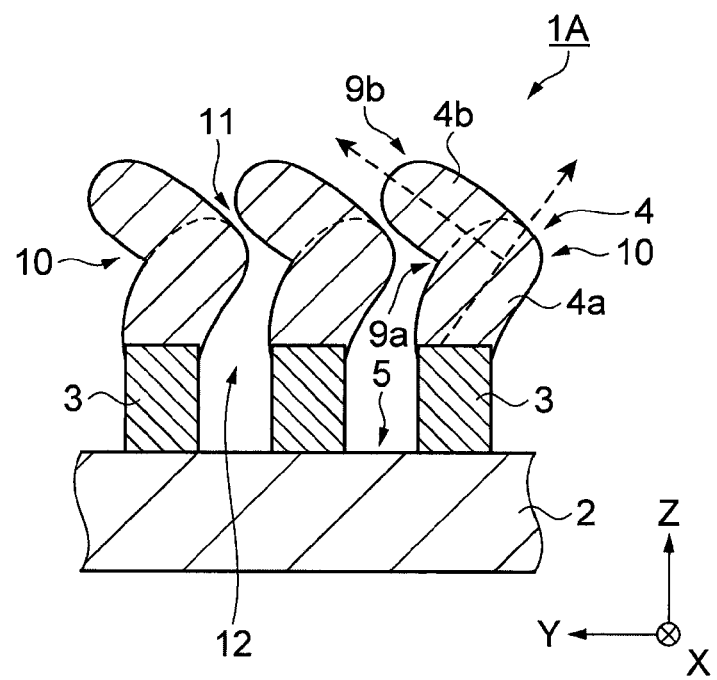

Firstly, a configuration of the polarization element will be explained. FIGS. 1A and 1B show the configuration of the polarization element according to a first embodiment of the invention, wherein FIG. 1A is a perspective view, and FIG. 1B is a cross-sectional view. It should be noted that in the following explanations, an XYZ coordinate system is assumed, and positional relationships between the respective members will be explained with reference to the XYZ coordinate system. In this case, it is assumed that a predetermined direction in a horizontal plane is an X-axis direction (a first direction), a direction perpendicular to the X-axis direction in the horizontal plane is a Y-axis direction (a second direction), a direction perpendicular to both of the X-axis direction and the Y-axis direction in a vertical plane is a Z-axis direction. In the illustrations of the present embodiment, it is assumed that the direction along which protruding sections described below extend is the X-axis direction, and the array axis of the protruding sections is the Y-axis direction.

As shown in FIG. 1A, the polarization element 1A is provided with a substrate 2, a plurality of protruding sections 3 formed on the substrate 2 in a striped manner in a plan view, and heat radiation sections 4 provided to the top portions of the respective protruding sections 3.

The substrate 2 has a light transmitting property to the light beam with a predetermined wavelength used for the polarization element 1A.

Such a substrate 2 is made of a material having translucency such as glass, quartz, or plastic. It should be noted that since the polarization element 1A might store heat to be heated to high temperature depending on the usage to which the polarization element 1A is applied, it is preferable to use glass or quartz having high heat resistance as the material of the substrate 2.

On the surface (either one of the surfaces) of the substrate 2, there is formed a plurality of protruding sections 3 extending in the X-axis direction in a substantially striped manner in a plan view. In other words, the plurality of protruding sections 3 is disposed on the substrate 2 so as to extend along the X-axis direction (the first direction) with intervals in the Y-axis direction (the second direction), and protrudes toward the opposite side to the substrate 2. Further, the protruding sections 3 are each made of metal (metal protruding sections).

The protruding sections 3 each have a reflective property to the light beam with a predetermined wavelength used for the polarization element 1A. Further, it is preferable that the protruding sections 3 each have a light shielding property to the light beam with a predetermined wavelength used for the polarization element 1A.

Such protruding sections 3 are each made of, for example, a light reflecting material having a relatively high light reflecting property, and as such a light reflecting material, there are cited metal materials (single metal or alloys including at least one of the metal materials) such as aluminum (Al), gold (Au), silver (Ag), chromium (Cr), titanium (Ti), nickel (Ni), tungsten (W), iron (Fe), and copper (Cu). Further, a groove 5 is provided between adjacent ones of the protruding sections 3. The groove sections 5 are formed at constant intervals with a pitch shorter than the wavelength of visible light in the Y-axis direction, and the protruding sections 3 are also arranged with the same pitch. For example, the height of the protruding sections 3 is in a range of 50 through 200 nm, and the width of the protruding sections 3 is 70 nm. Further, each of the intervals (the width of the groove sections 5 in the Y-axis direction) of the adjacent ones of the protruding sections 3 is 70 nm, and the pitch is 140 nm. As described above, the polarization element 1A has a wire grid structure composed of a plurality of protruding sections 3.

Further, it is preferable that such protruding sections 3 are made of a material having higher thermal conductivity than that of the constituent material of the substrate 2 described above. Thus, it becomes possible to efficiently conduct heat from the substrate 2 to the heat radiation sections 4 via the protruding sections 3.

On the top portion of each of the protruding sections 3, there is formed the heat radiation section 4 extending in the X-axis direction. It should be noted that it is sufficient to dispose the heat radiation section 4 on at least a half of the plurality of protruding sections 3 protruding toward the opposite side to the substrate 2.

As described above, depending on the usage to which the polarization element 1A is applied to, the polarization element 1A (in particular the substrate 2) stores heat to be heated to high temperature. Therefore, the heat radiation sections 4 each have a function of efficiently radiating heat. Further, the heat radiation sections 4 are each made of a material different from the constituent material of the protruding sections 3, and each have a light transmitting property to the light beam with a predetermined wavelength used for the polarization element 1A.

If the polarization element 1A is intended to be used for a light beam in the visible light range, for example, such heat radiation sections 4 are each formed of a dielectric substance having a low light absorbing property in the visible light range. As such a dielectric substance, there can be cited an oxide such as $SiO_2$, $Al_2O_3$, $Ti_2O$, $Ta_2O_5$, or a niobium oxide, or a nitride such as SiN. Such heat radiation sections 4 are made of a material having higher thermal conductivity than that of the constituent material of the substrate 2 described above. Thus, the heat from the substrate 2 can efficiently be radiated to the outside. Further, if the heat radiation sections 4 are made of a material different from the constituent material of the protruding section 3, since it results that the heat radiation sections 4 and the protruding sections 3 have refractive indexes different from each other, it becomes possible to reflect light at the boundary between the heat radiation sections 4 and the protruding sections 3.

Further, it is preferable that such heat radiation sections 4 are made of a material having the thermal conductivity equivalent to or higher than that of the constituent material of the protruding sections 3 described above. Thus, it becomes possible to make the heat radiation performance of the heat radiation section 4 particularly excellent.

Each of the heat radiation sections 4 has a concavo-convex section 9 (e.g., a concave section 9a and a convex section 9b) for obtaining a larger surface area. Further, as shown in FIG. 1A, the entire heat radiation sections 4 are provided with a concavo-convex shape substantially evenly patterned in every unit area in a plan view.

As shown in FIG. 1B, each of the heat radiation sections 4 is mainly composed of a first heat radiation section 4a and a second heat radiation section 4b. The first heat radiation section 4a is formed on the surface of the top portion of corresponding one of the protruding sections 3 so as to be tilted with respect to the surface of the top portion toward one of the two adjacent protruding sections 3. The second heat radiation section 4b is formed on the first heat radiation section 4a so as to be tilted with respect to the surface of the top portion of corresponding one of the protruding sections 3 toward the other of the two adjacent protruding sections 3. In other words, the first heat radiation section 4a and the second heat radiation section 4b are formed toward respective tilted directions different from each other with respect to the surface of the top portion of the corresponding one of the protruding sections 3. Therefore, the heat radiation sections 4 are each provided with a bend section 10 bending at the junction portion between the first heat radiation section 4a and the second heat radiation section 4b. In the present embodiment, the bend section 10 bending in the Y-axis direction is formed, and the entire heat radiation sections 4 are regularly arranged in the Y-axis direction. Further, in a cross-sectional view (when viewed in a cross-sectional surface perpendicular to the X-axis direction), a gap 11 is provided between adjacent ones of the heat radiation sections 4. By providing the gap 11 as described above, it becomes possible to release the stored heat from the gaps 11, thus the heat radiation effect can be improved.

Specifically, as shown in FIG. 1B, each of the heat radiation sections 4 is bent or curved at a point when viewed in a cross-sectional surface perpendicular to the X-axis direction (the first direction). Thus, it becomes possible to increase the surface area of each of the heat radiation sections 4. Therefore, it becomes possible to make the heat radiation property of each of the heat radiation sections 4 excellent to thereby prevent the temperature of the polarization element 1A from rising excessively. As a result, the degradation of the optical characteristics of the polarization element 1A can be prevented.

In particular, each of the heat radiation sections 4 has a first portion tilted with respect to the Z-axis direction (i.e., the normal direction of the substrate 2) in a cross-sectional view perpendicular to the X-axis direction (the first direction), and a second portion disposed at a position on the opposite side of the first portion to the substrate 2 so as to be tilted with respect to the Z-axis direction toward the opposite side to the first portion. Such heat radiation sections 4 are each arranged to be bent or curved in the cross-sectional view perpendicular to the X-axis direction (the first direction). Thus, it becomes possible to increase the surface area of each of the heat radiation sections 4. It should be noted that in the present embodiment, the first heat radiation section 4a described above has the first portion, and the second heat radiation section 4b described above has the second portion.

Further, in the plan view (viewed from the Z-axis direction) the heat radiation sections 4 are formed so that adjacent ones of the heat radiation sections 4 partially overlap each other. Therefore, as shown in FIG. 1A, the heat radiation sections 4 are formed so as to cover the surface of the substrate 2 and the protruding sections 3 in the plan view. Therefore, the heat radiation sections 4 have a heat radiation function, and at the same time, function as a protective film for protecting the substrate 2 and the protruding sections 3. In other words, it becomes possible to make handling of the polarization element easy, and at the same time, to prevent dust, moisture (water droplets), and so on from entering the substrate 2 and the protruding sections 3 to thereby enhance the reliability.

Further, as shown in FIG. 1B, the polarization element 1A has a space 12 surrounded by the substrate 2 two adjacent ones of the protruding sections 3 and the two heat radiation sections 4 respectively provided to the two protruding sections 3. Since the space 12 is filled with air (or vacuum atmosphere), the refractive index of the space between the two adjacent protruding sections 3 becomes nearly one. Therefore, the optical characteristic can sufficiently be assured. Further, in the polarization element 1A configured as described above, it is possible to transmit linearly polarized light (a TM wave) vibrating in a direction (the Y-axis direction) substantially perpendicular to the extending direction of the protruding sections 3 while reflecting linearly polarized light (a TE wave) vibrating in a direction substantially parallel to the extending direction (the X-axis direction) of the protruding sections 3.

Method of Manufacturing Polarization Element

Figure 2A:
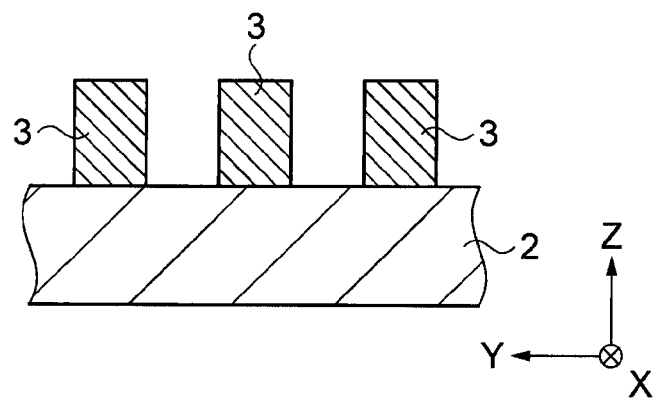
FIGS. 2A through 2C are process charts showing a method of manufacturing the polarization element according to the first embodiment.
Figure 2B:
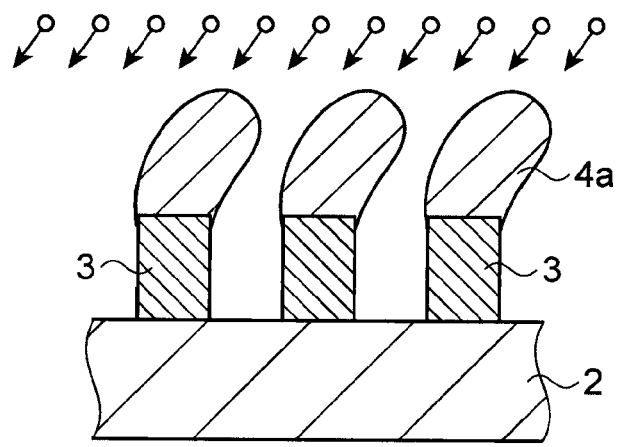
Figure 2C:
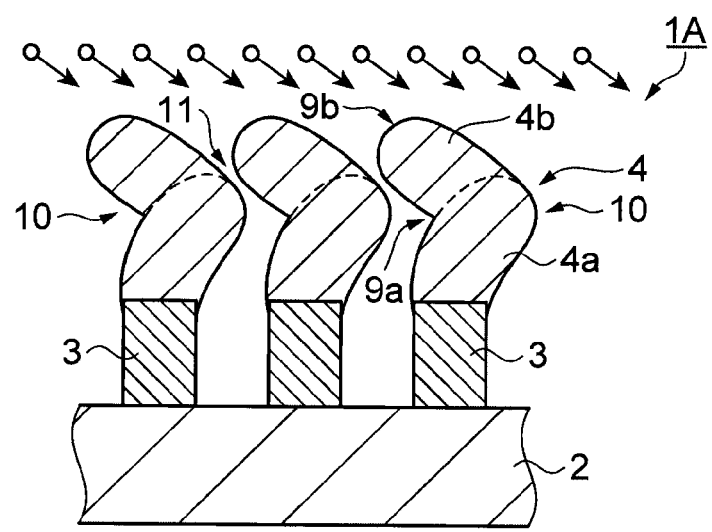

Then, a method of manufacturing the polarization element 1A according to the present embodiment will hereinafter be explained. FIGS. 2A through 2C are process charts showing the method of manufacturing the polarization element according to the first embodiment. The method of manufacturing the polarization element 1A according to the present embodiment includes a protruding section forming process for forming a plurality of protruding sections 3 in a striped manner in a plan view, and a heat radiation section forming process for forming the heat radiation sections 4 having the concavo-convex sections 9 (e.g., 9a, 9b) on the top portions of the respective protruding sections 3. Further, the heat radiation section forming process includes a first heat radiation section forming process for performing oblique deposition from one of the adjacent protruding sections 3 to form the tilted first heat radiation sections 4a on the top portions of the protruding sections 3, and a second heat radiation section forming process for performing the oblique deposition from the other of the adjacent protruding sections 3 to form the tilted second heat radiation sections 4b on the first heat radiation sections 4a. Hereinafter, the explanation will be presented with reference to the drawings.

In the protruding section forming process shown in FIG. 2A, the protruding sections 3 are formed on the substrate 2. Specifically, a conductive film made of, for example, aluminum, silver, or the like (the light reflecting material described above) is deposited on the substrate 2 made of, for example, glass, quartz, or the like (the material having light transmitting property described above), and then a resist film is formed on the conductive film. Subsequently, the resist film is exposed, and then developed to thereby develop a substantially striped pattern in the resist film. Subsequently, the conductive film is etched as deep as to reach the surface of the substrate 2 using the resist film thus developed as the etching mask. Subsequently, by removing the resist film, the plurality of protruding sections 3 disposed on the substrate 2 in a striped manner is formed as shown in FIG. 2A.

In the first heat radiation section forming process shown in FIG. 2B, a dielectric material is obliquely deposited to thereby form the tilted first heat radiation sections 4a on the top portions of the protruding sections 3. Specifically, sputtered particles are deposited from an oblique direction to the substrate 2 provided with the protruding sections 3 using, for example, sputtering equipment to thereby form the first heat radiation sections 4a thus tilted on the top portions of the protruding sections 3. It should be noted that in FIGS. 2B and 2C, the incident direction of the sputtered particles is indicated by arrows. The tilt angle of the oblique deposition with respect to the surface of the substrate 2 can arbitrarily be set within a range of about 0 through 50°.

In the second heat radiation section forming process shown in FIG. 2C, the dielectric material is obliquely deposited to thereby form the tilted second heat radiation sections 4b on the first heat radiation sections 4a. Specifically, sputtered particles are deposited from an oblique direction to the substrate 2 provided with the protruding sections 3 using, for example, sputtering equipment to thereby form the second heat radiation sections 4b thus tilted on the first heat radiation sections 4a. The tilt angle of the oblique deposition with respect to the substrate 2 can arbitrarily be set within a range of about 0 through 45°. In this case, the oblique deposition is performed from the direction of the other of the adjacent protruding sections 3 described above, namely the opposite direction to the direction of the oblique deposition for forming the first heat radiation sections 4a. In such a manner as described above, the second heat radiation sections 4b tilted in the direction opposite to the tilt direction of the first heat radiation section 4a are formed. By forming the second heat radiation sections 4b, the heat radiation sections 4 are completed.

Here, in the first heat radiation section forming process, when performing the oblique deposition, the deposition between the protruding sections 3 or on the surface of the substrate 2 becomes difficult due to the effect of shadowing by a part of each of the protruding sections 3. In the similar manner, also in the second heat radiation section forming process, when performing the oblique deposition, the deposition between the protruding sections 3 or on the surface of the substrate 2 becomes difficult due to the effect of shadowing by a part of each of the first heat radiation sections 4a. Further, due to the effect of shadowing by a part of each of the first heat radiation sections 4a, a gap 11 is formed between adjacent ones of the heat radiation sections 4. In such a manner as described above, the space 12 can surely be formed.

Further, by the junctions between the first heat radiation sections 4a and the second heat radiation sections 4b, the concavo-convex sections 9 (e.g., the concave sections 9a and the convex sections 9b) are formed, and at the same time, the bend sections 10 bending in the same direction are formed at the junction sections between the first heat radiation sections 4a and the second heat radiation sections 4b. Further, since the heat radiation sections 4 are arranged so that adjacent ones of the heat radiation sections 4 partially overlap each other, the substrate 2 and the protruding sections 3 can be covered in the plan view.

It should be noted that in the oblique deposition in the first and second heat radiation section forming processes described above, the amount of sputtered particles is different between the side near to the target and the side far from the target of the sputtering equipment, and there is a tendency that the closer to the target, the larger amount of sputtered particles is deposited. Therefore, in the first heat radiation section forming process shown in FIG. 2B, the closer (on the side along the Y-axis direction toward the negative side thereof) to the target of the sputtering equipment, the larger the volume of the first heat radiation section 4a becomes, and the further (on the side along the Y-axis direction toward the positive side thereof) from the target, the smaller the volume of the first heat radiation section 4a becomes. On the other hand, in the second heat radiation section forming process shown in FIG. 2C, the closer (on the side along the Y-axis direction toward the positive side thereof) to the target of the sputtering equipment, the larger the volume of the second heat radiation section 4b becomes, and the further (on the side along the Y-axis direction toward the negative side thereof) from the target, the smaller the volume of the second heat radiation section 4b becomes. Therefore, although the volumes of the first heat radiation sections 4a and the second heat radiation sections 4b are different from each other, the sum of the volumes of the first heat radiation section 4a and the second heat radiation section 4b corresponding to the same protruding section 3 is the same between the protruding sections, and thus, the heat radiation sections 4 having the same total volumes are formed on the respective protruding sections 3. Thus, the polarization state is stabled, and the optical characteristics can be improved. By passing through the processes described above, the polarization element 1A can be manufactured.

Configuration of Electronic Device

Figure 3:
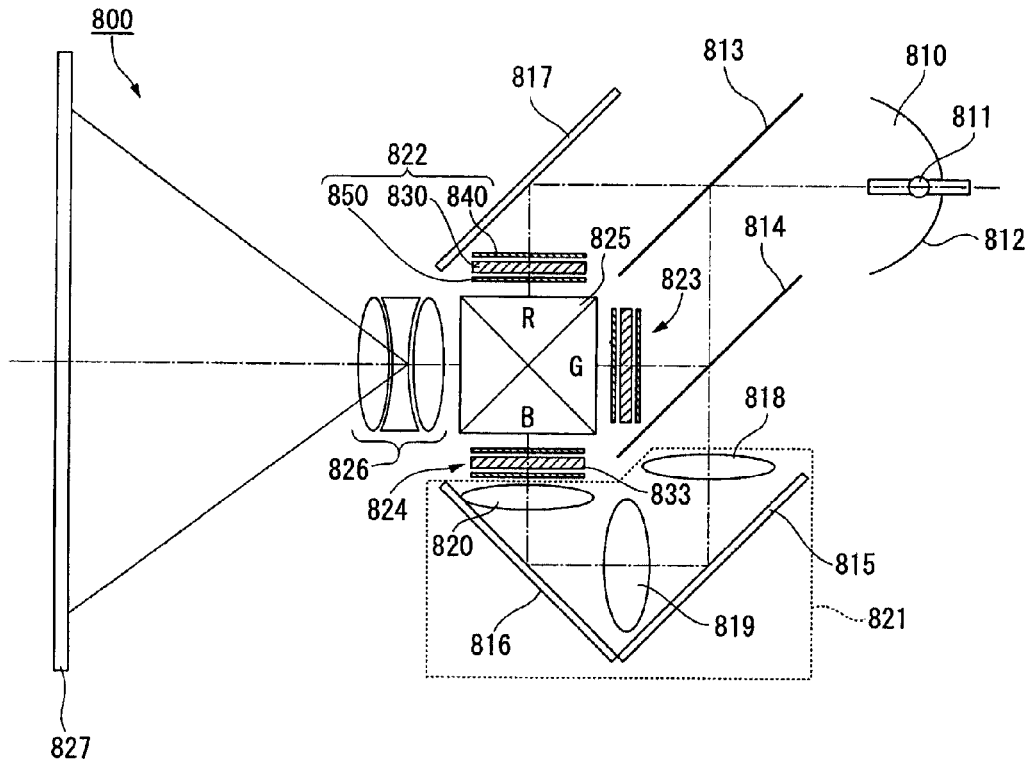
FIG. 3 is a schematic diagram showing a configuration of a projector as an electronic device.

The configuration of the electronic device will hereinafter be explained. FIG. 3 is a schematic diagram showing the configuration of a projector as the electronic device. As shown in FIG. 3, a projector 800 has a light source 810, dichroic mirrors 813, 814, reflecting mirrors 815, 816, 817, an entrance lens 818, a relay lens 819, an exit lens 820, light modulation sections 822, 823, 824, a cross dichroic prism 825, a projection lens 826, and so on.

The light source 810 is composed of a lamp 811 such as a metal halide lamp, and a reflector 812 for reflecting the light of the lamp 811. It should be noted that as the light source 810, a super-high pressure mercury lamp, a flash mercury lamp, a high-pressure mercury lamp, a deep UV lamp, a xenon lamp, a xenon flash lamp, and so on can also be used besides the metal halide lamp.

The dichroic mirror 813 transmits red light included in white light emitted form the light source 810, and reflects blue light and green light. The red light thus transmitted is reflected by the reflecting mirror 817, and input to the light modulation section 822 for the red light. Further, the green light out of the blue light and the green light both reflected by the dichroic mirror 813 is reflected by the dichroic mirror 814, and is input to the light modulation section 823 for the green light. The blue light is transmitted through the dichroic mirror 814, and is input to the light modulation section 824 for the blue light via the relay optical system 821 provided for preventing the light loss due to a long light path, and including the entrance lens 818, the relay lens 819, and exit lens 820.

The light modulation sections 822 through 824 each have an entrance side polarization element section 840 and an exit side polarization element section 850 disposed on the both sides of a liquid crystal light valve 830 so as to sandwich the liquid crystal light valve 830. The entrance side polarization element section 840 and the exit side polarization element section 850 are arranged so as to have the respective transmission axes perpendicular to each other (the cross-Nicol arrangement). Further, the entrance side polarization element section 840 and the exit side polarization element section 850 each include the polarization element 1A described above.

The three colored light beams modulated by the respective light modulation sections 822 through 824 are input to the cross dichroic prism 825. The cross dichroic prism 825 is composed of four rectangular prisms bonded to each other, and on the interface therebetween, there are formed a dielectric multilayer film for reflecting the red light and a dielectric multilayer film for reflecting the blue light to have an X shape. The three colored light beams are combined by these dielectric multilayer films to form a light beam for representing a color image. The light beam obtained by combining the three colored light beams is projected on a screen 827 by the projection lens 826 as a projection optical system, thus the image is displayed in an enlarged manner.

In the projector 800 having the configuration described above, since the polarization element 1A is used in each of the entrance side polarization element section 840 and the exit side polarization element section 850, the heat radiation property is enhanced by the heat radiation section 4, and the deterioration of the light modulation sections 822 through 824 can be prevented even when using a high power light source. Therefore, the projector 800 having high reliability and superior display characteristics can be provided.

Configuration of Liquid Crystal Device

Figure 4:
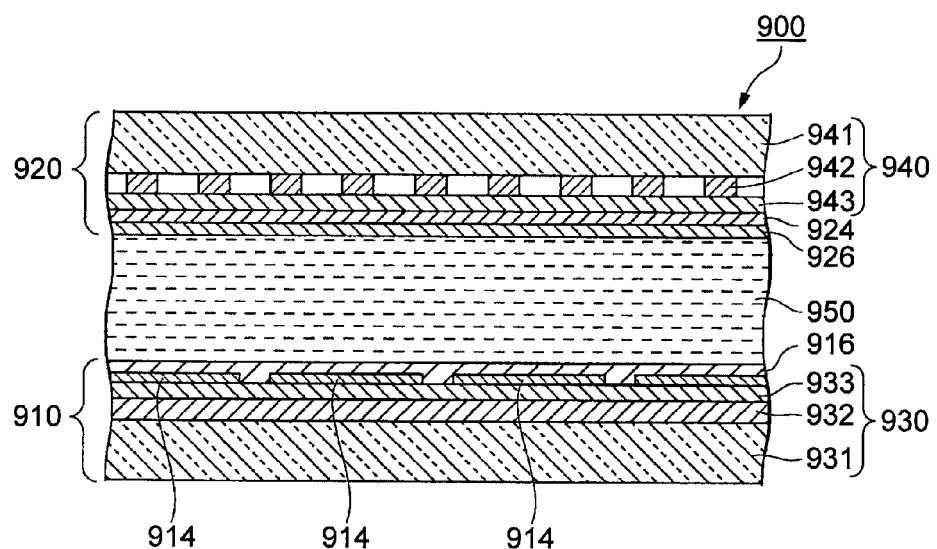
FIG. 4 is a schematic diagram showing a configuration of a liquid crystal device.

The configuration of a liquid crystal device will hereinafter be explained. FIG. 4 is a schematic diagram showing the configuration of the liquid crystal device. As shown in FIG. 4, the liquid crystal device 900 is provided with an element substrate 910, an opposed substrate 920, and a liquid crystal layer 950 disposed between the element substrate 910 and the opposed substrate 920.

The element substrate 910 and the opposed substrate 920 are provided with polarization element sections 930, 940, respectively. The polarization element sections 930, 940 each include the polarization element 1A described above.

The polarization element section 930 is provided with a substrate main body 931, protruding sections 932, and heat radiation sections 933, and the polarization element section 940 is provided with a substrate main body 941, protruding sections 942, and heat radiation sections 943. In the present embodiment, the substrate main bodies 931, 941 are substrates of the polarization elements, and at the same time, the substrates of the liquid crystal device. Further, the protruding sections 932 and the protruding sections 942 are disposed so as to intersect with each other.

On the inner surface side (the side of the liquid crystal layer 950) of the polarization element section 930, there are provided pixel electrodes 914, wiring not shown, and TFT elements, and further, an oriented film 916 is also provided. Similarly, on the inner surface side (the side of the liquid crystal layer 950) of the polarization element section 940, there are disposed a common electrode 924 and an oriented film 926.

In the liquid crystal device 900 having the configuration described above, since the polarization element provided with the heat radiation section is disposed in each of the polarization element sections 930, 940, the heat radiation characteristic can be improved. Further, since the substrate main bodies 931, 941 have both of the function of the substrate for the liquid crystal device and the function of the substrate for the polarization element, the number of components can be reduced. Therefore, the entire device can be made thinner, and the function of the liquid crystal device 900 can be improved. Further, since the device structure can be simplified, manufacturing becomes easier, and at the same time, the cost reduction can be achieved.

Configuration of Electronic Device Equipped with Liquid Crystal Device

Figure 5:
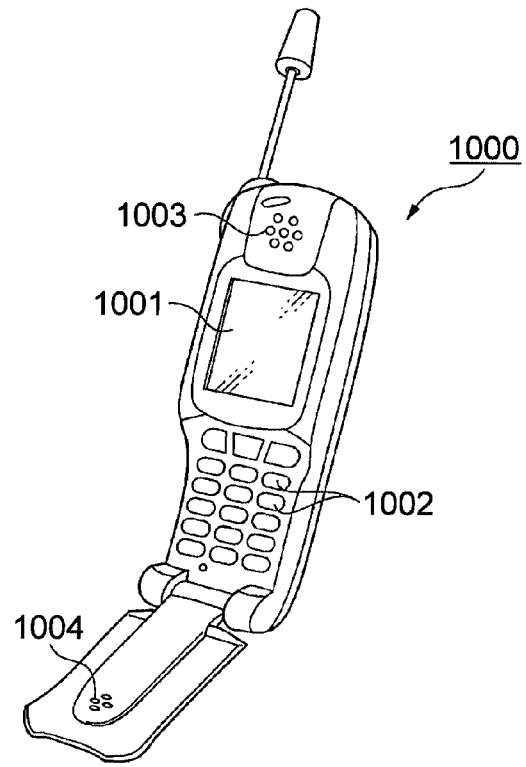
FIG. 5 is a perspective view showing a configuration of a cellular phone as an electronic device equipped with the liquid crystal device.

The configuration of the electronic device equipped with the liquid crystal device will hereinafter be explained. FIG. 5 is a perspective view showing a configuration of a cellular phone as the electronic device equipped with the liquid crystal device. As shown in FIG. 5, the cellular phone 1000 is provided with a display section 1001 including the liquid crystal device 900, a plurality of operation buttons 1002, an ear piece 1003, a mouthpiece 1004, and so on. Thus, the cellular phone 1000 equipped with the display section superior in reliability and capable of high-quality display can be provided.

Further, the liquid crystal device 900 described above can preferably be used as an image display section of an electronic book, a personal computer, a digital still camera, a liquid crystal television, a projector, a video cassette recorder of either a view-finder type or a direct view type, a car navigation system, a pager, a personal digital assistance, an electronic calculator, a word processor, a workstation, a picture phone, a POS terminal, a device equipped with a touch panel, and so on, besides the cellular phone 1000 described above.

Therefore, according to the first embodiment described above, the following advantages can be obtained.

1. Since the heat radiation sections 4 are each composed of the first heat radiation section 4a and the second heat radiation section 4b, and the first heat radiation section 4a and the second heat radiation section 4b are formed toward oblique directions different from each other, the bend section 10 is formed at the junction section between the first and second heat radiation sections 4a, 4b, and at the same time, the concavo-convex section 9 is also formed. Therefore, the surface area of the heat radiation section 4 is increased, and thus, the heat radiation property can easily be improved.

2. The gap 11 is provided between adjacent ones of the heat radiation sections 4. Thus, the heat is radiated from the gap 11 in addition to the heat radiation from the protruding sections 3 and the heat radiation sections 4, and therefore, the heat radiation property can further be improved.

3. The heat radiation sections 4 cover the substrate 2 and the protruding sections 3 in the plan view. Therefore, the heat radiation sections 4 have a heat radiation function, and at the same time, function as a protective film for protecting the protruding sections 3 and the substrate 2. In other words, it becomes possible to make handling of the polarization element 1A easy, and at the same time, to prevent dust, moisture, and so on from entering the substrate 2 and the protruding sections 3 to thereby enhance the reliability.

Second Embodiment

A second embodiment will hereinafter be described.

Configuration of Polarization Element

Figure 6:
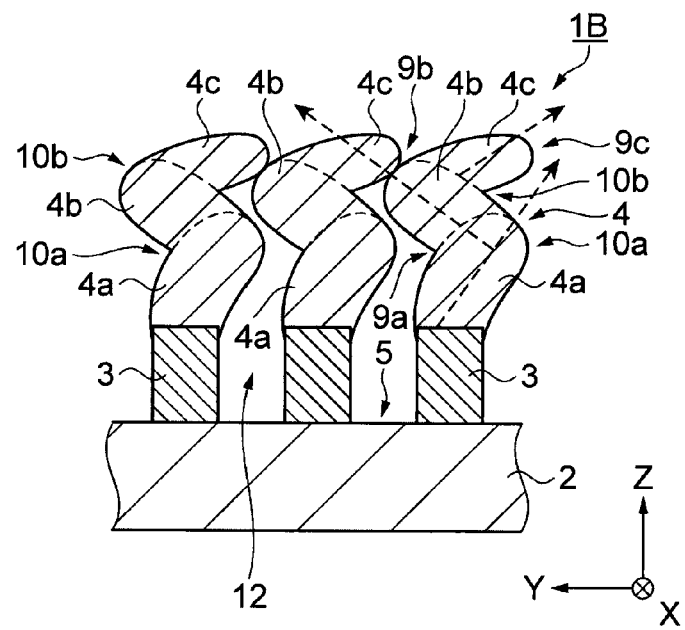
FIG. 6 is a schematic diagram showing a configuration of a polarization element according to a second embodiment of the invention.

Firstly, a configuration of the polarization element will be explained. FIG. 6 is a schematic diagram of the polarization element according to the second embodiment. The polarization element 1B according to the present embodiment is different from the polarization element 1A according to the first embodiment in that there are provided third heat radiation sections 4c. Since the other points are substantially the same as those of the first embodiment, the same sections are denoted as the same reference symbols. Further, in the following explanation, an XYZ coordinate system is assumed, and positional relationships between the respective members will be explained with reference to the XYZ coordinate system. In this case, it is assumed that a predetermined direction in a horizontal plane is an X-axis direction, a direction perpendicular to the X-axis direction in the horizontal plane is a Y-axis direction, and a direction perpendicular to both of the X-axis direction and the Y-axis direction in a vertical plane is a Z-axis direction. In the illustrations of the present embodiment, it is assumed that the direction along which protruding sections described below extend is the X-axis direction, and the array axis of the protruding sections is the Y-axis direction.

As shown in FIG. 6, the polarization element 1B is provided with a substrate 2, a plurality of protruding sections 3 formed on the substrate 2 in a striped manner in a plan view, and heat radiation sections 4 provided to the top portions of the respective protruding sections 3. It should be noted that the configurations of the substrate 2 and the protruding sections 3 and so on are substantially the same as those of the first embodiment, and therefore, the explanation therefor will be omitted.

On the top portion of each of the protruding sections 3, there is formed the heat radiation section 4 extending in the X-axis direction. Such heat radiation sections 4 are each formed of a dielectric substance having a low light absorbing property in the visible light range. As such a dielectric substance, there can be cited an oxide such as $SiO_2$, $Al_2O_3$, $Ti_2O$, $Ta_2O_5$, or a niobium oxide, or a nitride such as SiN.

Each of the heat radiation sections 4 has a concavo-convex section 9 (e.g., a concave section 9a, convex sections 9b, 9c) for obtaining a larger surface area. Further, the entire heat radiation sections 4 are provided with a concavo-convex shape substantially evenly patterned in every unit area in a plan view.

Each of the heat radiation sections 4 has a first heat radiation section 4a, a second heat radiation section 4b, and a third heat radiation section 4c. The first heat radiation section 4a is formed on the surface of the top portion of corresponding one of the protruding sections 3 so as to be tilted with respect to the surface of the top portion toward one of the two adjacent protruding sections 3. The second heat radiation section 4b is formed on the first heat radiation section 4a so as to be tilted with respect to the surface of the top portion of corresponding one of the protruding sections 3 toward the other of the two adjacent protruding sections 3. In other words, the first heat radiation section 4a and the second heat radiation section 4b are formed toward respective tilted directions different from each other with respect to the surface of the top portion of the corresponding one of the protruding sections 3. Further, a third heat radiation section 4c is formed between the adjacent ones of the second heat radiation sections 4b. In the present embodiment, the third heat radiation section 4c is formed so as to be tilted with respect to the surface of the top portion toward the one of the two adjacent protruding sections 3. In other words, the third heat radiation section 4c is formed so as to be tilted in the same direction as the first heat radiation section 4a. Therefore, a bend section 10a bending at the junction section between the first heat radiation section 4a and the second heat radiation section 4b is formed, and at the same time, a bend section 10b bending at the junction section between the second heat radiation section 4b and the third heat radiation section 4c is formed. In the present embodiment, each of the heat radiation sections 4 has the bend sections 10a, 10b bending in the Y-axis direction, and the entire heat radiation sections 4 are regularly arranged in the Y-axis direction. By forming the bend sections 10a, 10b as described above, the surface area of the heat radiation sections 4 can be increased at high density.

Specifically, as shown in FIG. 6, each of the heat radiation sections 4 has a first portion tilted with respect to the Z-axis direction (i.e., the normal direction of the substrate 2) in a cross-sectional view perpendicular to the X-axis direction (the first direction), a second portion disposed at a position on the opposite side of the first portion to the substrate 2 so as to be tilted with respect to the Z-axis direction toward the opposite side to the first portion, and a third portion disposed at a position on the opposite side of the second portion to the substrate 2 so as to be tilted with respect to the Z-axis direction toward the opposite side to the second portion. Such heat radiation sections 4 are each arranged to be bent or curved at two positions in the cross-sectional view perpendicular to the X-axis direction. Thus, it becomes possible to further increase the surface area of each of the heat radiation sections 4. It should be noted that in the present embodiment, the first heat radiation section 4a described above has the first portion, the second heat radiation section 4b described above has the second portion, and the third heat radiation section 4c described above has the third portion.

Further, the polarization element 1B has a space 12 surrounded by the substrate 2, two adjacent ones of the protruding sections 3 and the two heat radiation sections 4 respectively provided to the two protruding sections 3. Further, in detail, the space 12 is surrounded by the substrate 2, the two adjacent protruding sections 3, and the two first heat radiation sections 4a, the two second heat radiation sections 4b, and the two third heat radiation sections 4c provided to the two protruding sections 3. Since the space 12 is filled with air (or vacuum atmosphere), the refractive index of the space between the two adjacent protruding sections 3 becomes nearly one. Therefore, the optical characteristic can sufficiently be assured.

Further, since in the present embodiment the spaces 12 are sealed by the third heat radiation sections 4c, the heat radiation sections 4 have a heat radiation function, and at the same time, function as a protective film for protecting the substrate 2 and the protruding sections 3. In other words, it becomes possible to make handling of the polarization element easy, and at the same time, to prevent dust and moisture from entering the substrate 2 and the protruding sections 3 to thereby enhance the reliability. Further, in the polarization element 1B configured as described above, it is possible to transmit linearly polarized light (the TM wave) vibrating in a direction (the Y-axis direction) substantially perpendicular to the extending direction of the protruding sections 3 while reflecting linearly polarized light (the TE wave) vibrating in a direction substantially parallel to the extending direction (the X-axis direction) of the protruding sections 3.

Method of Manufacturing Polarization Element

Figure 7:
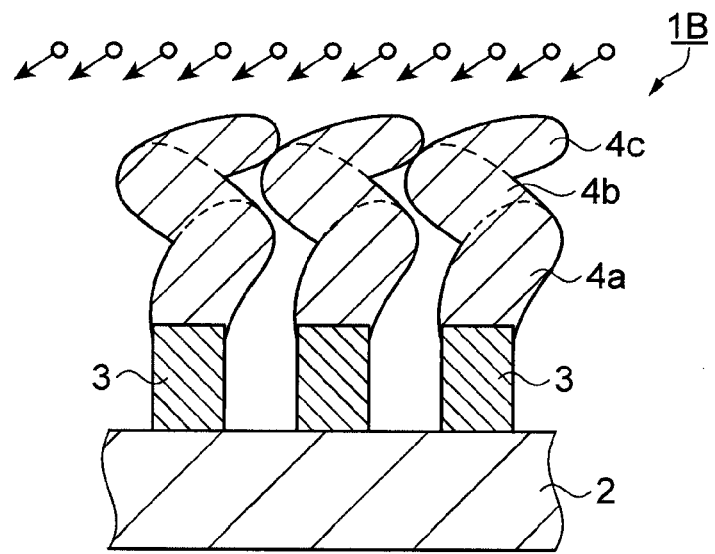
FIG. 7 is a process chart showing a method of manufacturing the polarization element according to the second embodiment.

A manufacturing method of the polarization element 1B according to the present embodiment will hereinafter be explained. FIG. 7 is a process chart showing the method of manufacturing the polarization element according to the second embodiment. The method of manufacturing the polarization element 1B according to the present embodiment includes a protruding section forming process for forming a plurality of protruding sections 3 in a striped manner in a plan view, and a heat radiation section forming process for forming the heat radiation sections 4 having the concavo-convex sections 9 (e.g., 9a, 9b, 9c) on the top portions of the respective protruding sections 3. Further, the heat radiation section forming process includes a first heat radiation section forming process for performing oblique deposition from one of the two adjacent protruding sections 3 to form the tilted first heat radiation sections 4a on the top portions of the protruding sections 3, a second heat radiation section forming process for performing the oblique deposition from the other of the adjacent protruding sections 3 to form the tilted second heat radiation sections 4b on the first heat radiation sections 4a, and a third heat radiation section forming process for forming the third heat radiation sections 4c between the adjacent second heat radiation sections 4b after the second heat radiation section forming process. Hereinafter, the explanation will be presented with reference to the drawings. It should be noted that since the protruding section forming process and the first and second heat radiation section forming processes in the present embodiment are substantially the same as those in the first embodiment, the explanation therefor will be omitted (see FIGS. 2A through 2C), and the third heat radiation section forming process will be explained.

In the third heat radiation section forming process shown in FIG. 7, the third heat radiation sections 4c made of a dielectric material are each formed between the two adjacent second heat radiation sections 4b. Specifically, sputtered particles are deposited from an oblique direction to the substrate 2 provided with the protruding sections 3 using, for example, sputtering equipment to thereby form the third heat radiation sections 4c thus tilted on the second heat radiation sections 4b. It should be noted that in FIG. 7 the incident direction of the sputtered particles is indicated by arrows. In the present embodiment, the oblique deposition is performed from the direction of the one of the adjacent protruding sections 3 described above, namely the same direction as the direction of the oblique deposition for forming the first heat radiation sections 4a. It should be noted that the tilt angle of the oblique deposition with respect to the surface of the substrate 2 can arbitrarily be set within a range of about 0 through 50°. Here, since a part of each of the protruding sections 3 and the first and second heat radiation sections 4a, 4b exerts the shadowing effect when performing the oblique deposition, the deposition is not performed between the protruding sections 3 and on the surface of the substrate 2.

According to the third heat radiation section forming process, the third heat radiation sections 4c thus tilted are formed on the respective second heat radiation sections 4b. Further, by forming the third heat radiation sections 4c, the bend sections 10b bending at the junction sections between the second heat radiation sections 4b and the third heat radiation sections 4c are formed. Therefore, in the heat radiation sections 4 in the present embodiment, the two bend sections 10a, 10b are provided to the heat radiation section 4 formed corresponding to each of the protruding sections 3. Further, by forming the third heat radiation sections 4c, there are formed the spaces 12 each surrounded by the substrate 2, the two adjacent protruding sections 3, and the two first heat radiation sections 4a, the two second heat radiation sections 4b, and the two third heat radiation sections 4c provided to the two protruding sections 3.

Configuration of Electronic Device

The basic configuration of the projector as the electronic device is substantially the same as that of the first embodiment, and therefore, the explanation therefor will be omitted (see FIG. 3). It should be noted that the entrance side polarization element section 840 and the exit side polarization element section 850 constituting each of the light modulation sections 822 through 824 of the projector 800 shown in FIG. 3 include the polarization element 1B described above.

Configuration of Liquid Crystal Device

The basic configuration of the liquid crystal device is substantially the same as that of the first embodiment, and therefore, the explanation therefor will be omitted (see FIG. 4). It should be noted that each of the element substrate 910 and the opposed substrate 920 of the liquid crystal device 900 shown in FIG. 4 includes the polarization element 1B described above.

Configuration of Electronic Device Equipped with Liquid Crystal Device

The configuration of the cellular phone as the electronic device equipped with the liquid crystal device 900 is substantially the same as that of the first embodiment, and therefore, the explanation therefor will be omitted (see FIG. 5). It should be noted that the display section 1001 of the cellular phone 1000 shown in FIG. 5 includes the polarization element 1B described above.

Therefore, according to the second embodiment described above, the following advantages can be obtained in addition to the advantages of the first embodiment.

1. Since the heat radiation sections 4 are each composed mainly of the first heat radiation section 4a, the second heat radiation section 4b, and the third heat radiation section 4c, the surface area of the heat radiation sections 4 can further be increased, thus the heat radiation property can further be enhanced.

2. By forming each of the third heat radiation sections 4c between the two adjacent second heat radiation sections 4b, the protruding sections 3 are covered with the heat radiation sections 4. Thus, the heat radiation sections 4 have a heat radiation function, and at the same time, function as a protective film for protecting the protruding sections 3 and the substrate 2. Therefore, it becomes possible to prevent dust, moisture, and so on from entering the protruding sections 3 and the surface of the substrate 2 to thereby enhance the reliability.

3. Each of the third heat radiation sections 4c is formed between the two adjacent second heat radiation sections 4b to form the spaces 12 each surrounded by the substrate 2, the adjacent two protruding sections 3, and the two first heat radiation sections 4a, the two second heat radiation sections 4b, and the two third heat radiation sections 4c provided to the two protruding sections 3. Thus, the refractive index of the space 12 becomes nearly one, and thus the optical characteristics can be improved.

Third Embodiment

A third embodiment will hereinafter be described.

Configuration of Polarization Element

Figure 8:
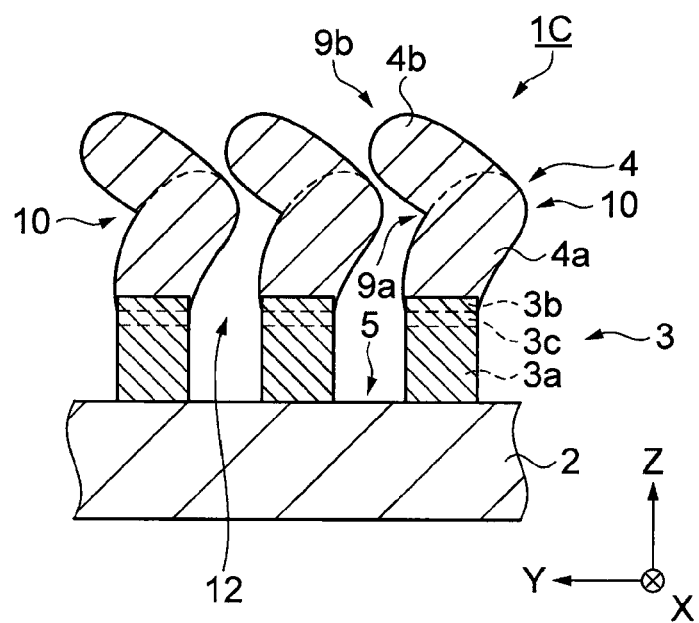
FIG. 8 is a schematic diagram showing a configuration of a polarization element according to a third embodiment of the invention.

Firstly, a configuration of the polarization element will be explained. FIG. 8 is a cross-sectional view of the polarization element according to the third embodiment. The polarization element 1C according to the present embodiment is different from the first embodiment in the form of the protruding sections 3. Since the other points are substantially the same as those of the first embodiment, the same sections are denoted as the same reference symbols. Further, in the following explanation, an XYZ coordinate system is assumed, and positional relationships between the respective members will be explained with reference to the XYZ coordinate system. In this case, it is assumed that a predetermined direction in a horizontal plane is an X-axis direction, a direction perpendicular to the X-axis direction in the horizontal plane is a Y-axis direction, and a direction perpendicular to both of the X-axis direction and the Y-axis direction in a vertical plane is a Z-axis direction. In the illustrations of the present embodiment, it is assumed that the direction along which protruding sections described below extend is the X-axis direction, and the array axis of the protruding sections is the Y-axis direction.

As shown in FIG. 8, the polarization element 1C is provided with a substrate 2, a plurality of protruding sections 3 formed on the substrate 2 in a striped manner in a plan view, and heat radiation sections 4 provided to the top portions of the respective protruding sections 3. It should be noted that the configurations of the substrate 2, the heat radiation sections 4, the spaces 12, and so on are substantially the same as those of the first embodiment, and therefore, the explanation therefor will be omitted. Further, a groove 5 is provided between adjacent ones of the protruding sections 3. The groove sections 5 are formed at constant intervals with a pitch shorter than the wavelength of visible light in the Y-axis direction, and the protruding sections 3 are also arranged with the same pitch. For example, the height of the protruding sections 3 is in a range of 50 through 200 nm, and the width of the protruding sections 3 is 70 nm. Further, each of the intervals (the width of the groove sections 5 in the Y-axis direction) of the adjacent ones of the protruding sections 3 is 70 nm, and the pitch is 140 nm. In other words, the polarization element 1C has a wire grid structure.

The protruding sections 3 each have a first protruding section 3a formed on the substrate 2, and a second protruding section 3b formed on the first protruding section 3a. The first protruding sections 3a are each made of a light reflecting material having a relatively high light reflecting property, and as such a light reflecting material, there can be cited metal materials (single metal or alloys including at least one of the metal materials) such as aluminum (Al), gold (Au), silver (Ag), chromium (Cr), titanium (Ti), nickel (Ni), tungsten (W), iron (Fe), and copper (Cu). The second protruding sections 3b are each made of a light absorbing material having a relatively high light absorbing property, and as such a light absorbing material, there can be cited a half-metallic material such as Si, Ge, Mo, Te, and so on. It should be noted that in the present embodiment, as shown in FIG. 8, it is possible to form the third protruding sections 3c each formed of an oxide film made of, for example, $SiO_2$, $Al_2O_3$, $Ti_2O$, $Ta_2O_5$, or niobium oxide between the first protruding sections 3a and the second protruding sections 3b.

Further, although the form of the heat radiation section 4 in the present embodiment is made similar to the form thereof in the first embodiment, the form of the heat radiation sections 4 is not limited thereto, but the form of the heat radiation sections 4 in the second embodiment can also be applied.

Method of Manufacturing Polarization Element

A method of manufacturing the polarization element 1C according to the present embodiment will hereinafter be explained. The method of manufacturing the polarization element 1C according to the present embodiment includes a protruding section forming process for forming a plurality of protruding sections 3 in a striped manner in a plan view, and a heat radiation section forming process for forming the heat radiation sections 4 having the concavo-convex sections 9 (e.g., 9a, 9b) on the top portions of the respective protruding sections 3. Further, the heat radiation section forming process includes a first heat radiation section forming process for performing oblique deposition from one of the adjacent protruding sections 3 to form the tilted first heat radiation sections 4a on the top portions of the protruding sections 3, and a second heat radiation section forming process for performing the oblique deposition from the other of the adjacent protruding sections 3 to form the tilted second heat radiation sections 4b on the first heat radiation sections 4a. It should be noted that since the first and second heat radiation section forming processes in the present embodiment are substantially the same as those in the first embodiment, the explanation therefor will be omitted, and the protruding section forming process will be explained.

In the protruding section forming process, the protruding sections 3 each having the first protruding section 3a and the second protruding section 3b are formed on the substrate 2. It should be noted that in the present embodiment, the third protruding section 3c is formed between the first protruding section 3a and the second protruding section 3b. Specifically, firstly, a conductive film made of Al, Ag, or the like (the light reflecting material described above) to be a material of the first protruding sections 3a is deposited on the substrate 2 made of glass, quartz, or the like. Subsequently, an oxide film made of $SiO_2$, $Al_2O_3$, or the like to be a material of the third protruding sections 3c described above is deposited on the conductive film. Subsequently, a half-metallic film made of Si, Ge, or the like to be a material of the second protruding sections 3b described above is deposited on the oxide film. Subsequently, a resist film is deposited on the half-metallic film. Subsequently, the resist film is exposed, and then developed to thereby develop a substantially striped pattern in the resist film. Subsequently, the half-metallic film, the oxide film, and the conductive film are etched as deep as to reach the surface of the substrate 2 using the resist film thus developed as the etching mask. Subsequently, by removing the resist film, the plurality of protruding sections 3 disposed on the substrate 2 in a striped manner is formed. Subsequently, by passing through the first and second heat radiation section forming processes similarly to the first embodiment, the polarization element 1C is completed.

Configuration of Electronic Device

The basic configuration of the projector as the electronic device is substantially the same as that of the first embodiment, and therefore, the explanation therefor will be omitted (see FIG. 3). It should be noted that at least the exit side polarization element section 850 out of the entrance side polarization element section 840 and the exit side polarization element section 850 constituting each of the light modulation sections 822 through 824 of the projector 800 shown in FIG. 3 includes the polarization element 1C.

Configuration of Liquid Crystal Device

The basic configuration of the liquid crystal device is substantially the same as that of the first embodiment, and therefore, the explanation therefor will be omitted (see FIG. 4). It should be noted that each of the element substrate 910 and the opposed substrate 920 of the liquid crystal device 900 shown in FIG. 4 includes the polarization element 1C described above.

Configuration of Electronic Device Equipped with Liquid Crystal Device

The configuration of the cellular phone as the electronic device equipped with the liquid crystal device 900 is substantially the same as that of the first embodiment, and therefore, the explanation therefor will be omitted (see FIG. 5). It should be noted that the display section 1001 of the cellular phone 1000 shown in FIG. 5 includes the polarization element 1C described above.

Therefore, according to the third embodiment described above, the following advantages can be obtained in addition to the advantages of the first and second embodiments.

1. The first protruding sections 3a are formed on the substrate 2 using the light reflecting material having a relatively high light reflecting property such as Al, Ag, or the like, and the second protruding sections 3b are formed on the respective first protruding sections 3a using the light absorbing material having a relatively high light absorbing property such as Si, Ge, or the like. Therefore, it is possible to assure the desired light absorbing property by the second protruding sections 3b while assuring the desired light reflecting property by the first protruding sections 3a. Thus, it is possible to improve the display contrast in the case of applying the polarization element 1C to the liquid crystal display device.

2. By forming the laminate structure having the first protruding sections 3a as a lower layer and the second protruding sections 3b as an upper layer, the TE wave can selectively be attenuated. In the case in which the second protruding sections 3b as the upper layer is used as the light absorbing layer, and the first protruding sections 3a as the lower layer is used as the light reflecting layer, the TE wave having entered from the upper layer side is attenuated due to the light absorbing action of the second protruding sections 3b in the upper layer, and a part of the TE wave is reflected by the first protruding section 3a in the lower layer without being absorbed. The TE wave thus reflected is further attenuated due to the absorption and interference effect exerted when passing through the upper layer. Therefore, due to the selective attenuation effect to the TE wave described above, the desired polarization characteristics can be obtained.

It should be noted that the invention is not limited to the embodiments described above, but the following modified examples can also be cited.

Modified Example 1

Although in the first through the third embodiments the cross-sectional shape of each of the protruding sections 3 is a rectangle, the invention is not limited thereto. For example, the cross-sectional shape of the protruding section 3 can be a trapezoid or a triangle. According also to this configuration, substantially the same advantages as in the embodiments can be obtained.

Modified Example 2

Although in the first embodiment the second heat radiation sections 4b are formed on the first heat radiation sections 4a, and further, in the second embodiment, the third heat radiation sections 4c are formed on the second heat radiation sections 4b, it is also possible to further form another heat radiation sections on the third heat radiation sections 4c. Thus, the surface area of the heat radiation section 4 is further increased, and thus, the heat radiation property can be improved.

Modified Example 3

Although in the first embodiment the tilt angle of the oblique deposition for forming the first heat radiation sections 4a and the tilt angle of the oblique deposition for forming the second heat radiation sections 4b are arranged to be symmetrical to each other about the surface of the substrate 2 and approximately equal to each other, the invention is not limited thereto. The oblique deposition can be performed with the tilt angles of the first heat radiation sections 4a and the second heat radiation sections 4b different from each other. According also to this configuration, substantially the same advantages as in the embodiments can be obtained. It should be noted that the same can be applied to the oblique deposition in the second and the third embodiments.

Modified Example 4

Although in the second embodiment the third heat radiation sections 4c are formed using the oblique deposition, the invention is not limited thereto. It is also possible to use a CVD method instead of the oblique deposition to form the third heat radiation sections 4c on the portion including the area between adjacent ones of the second heat radiation sections 4b. According also to this configuration, the space 12 can be formed, and at the same time, it becomes possible to homogenize the volumes of the heat radiation sections 4 formed on the respective protruding sections 3 to thereby improve the optical characteristics.

The entire disclose of Japanese Patent Application No.: 2009-250078, filed Oct. 30, 2009 and 2010-106683, filed May 6, 2010 are expressly incorporated by reference herein.

What is claimed is:

1. A polarization element comprising:
    a substrate;
    a plurality of metal protruding sections formed on the substrate in a striped manner in a plan view; and
    a heat radiation section formed on a top portion of each of the protruding sections,
    wherein each of the heat radiation sections has a concave section and a convex section that includes a first heat radiation section formed on a surface of the top portion of each of the protruding sections and a second heat radiation section formed on the first heat radiation section,
    each of the heat radiation sections are entirely separated by a gap from adjacent heat radiation sections, the gap being operable to release heat stored therein; and
    all of the first heat radiation sections are tilted in a first direction toward one of adjacent ones of the protruding sections with respect to the surface of the top portion, and all of the second heat radiation sections are tilted in a second and opposite direction toward the other of adjacent ones of the protruding sections with respect to the surface of the top portion.

2. The polarization element according to claim 1, wherein the heat radiation sections each have a bend section bending toward the same direction.

3. The polarization element according to claim 1, wherein adjacent ones of the heat radiation sections partially overlap each other, and
    the heat radiation sections are formed so as to cover a surface of the substrate in a plan view.

4. The polarization element according to claim 1, wherein the heat radiation section further includes a third heat radiation section formed between adjacent ones of the second heat radiation sections.

5. The polarization element according to claim 1, wherein there are provided spaces each surrounded by the substrate, adjacent ones of the protruding sections, and the heat radiation sections formed on the respective protruding sections.

6. The polarization element according to claim 1, wherein each of the protruding sections includes
    a first protruding section formed on the substrate, and
    a second protruding section formed on the first protruding section,
    the first protruding section is made of a light reflecting material having a relatively high light reflecting property, and
    the second protruding section is made of a light absorbing material having a relatively high light absorbing property.

7. A liquid crystal device comprising:
    the polarization element according to claim 1.

8. An electronic device comprising:
    the polarization element according to claim 1.

9. An electronic device comprising:
the liquid crystal device according to claim 7.

\* \* \* \* \*